United States Patent [19]

Hubbard, II

[11] Patent Number: 4,697,727

[45] Date of Patent: Oct. 6, 1987

[54] DOCUMENT FEED TRACTOR

[75] Inventor: Dohn D. Hubbard, II, Somerset, Mass.

[73] Assignee: Precision Handling Devices, Inc., Fall River, Mass.

[21] Appl. No.: 801,439

[22] Filed: Nov. 25, 1985

[51] Int. Cl.[4] .................... G03B 1/22

[52] U.S. Cl. .................... 226/74

[58] Field of Search .................... 226/52, 74, 75; 400/616-616.3

[56] References Cited

U.S. PATENT DOCUMENTS

| | | | |
|---|---|---|---|
| 3,930,601 | 1/1976 | Masuda | 226/74 |
| 4,129,239 | 12/1978 | Hubbard | 226/75 |
| 4,194,660 | 3/1980 | Seitz | 226/74 |
| 4,227,821 | 10/1980 | Plaza et al. | 226/80 X |
| 4,421,261 | 12/1983 | Hubbard | 226/74 |

OTHER PUBLICATIONS

IBM Technical Disclosure Bulletin, vol. 20, No. 11B, Apr. 1978, p. 4741.

IBM Technical Disclosure Bulletin, vol. 28, No. 9, Feb. 1986.

*Primary Examiner*—Stuart S. Levy
*Assistant Examiner*—Lynn M. Sohacki
*Attorney, Agent, or Firm*—Martin LuKacher

[57] ABSTRACT

In order to maintain document feed tractors, especially of the type which have timing belts made of the elastomeric (rubber or plastic) material, in circumferential registration with the sprocket which engages and can drive the belt, a member is disposed circumferentially outward from the sprocket between the sides of the belt where the pins thereon can engage the perforations in the document. This member presents a spaced circumferential retainer outward from the sprocket a distance slightly greater than the altitude of the pins. Preferably this wall has a notch in alignment with the pins and which the pins slightly clear and are guided. The member provides for minimal frictional drag on the belt while maintaining the circumferential registration of the belt on the sprocket.

8 Claims, 3 Drawing Figures

DOCUMENT FEED TRACTOR

DESCRIPTION

The present invention relates to document feed tractors and particularly to document feed tractors of the type where the belt has a tendency to move out of registration with the sprocket of the tractor.

The invention is especially suitable for use in tractors having timing belts made of elastomeric material, such as rubber and plastic-like materials. Such belts may become extended as they travel around the drive sprocket of the tractor. The lugs on the belt then can become disengaged from their receptacles on the surface of the sprocket. This can permit the belt to slip and interfere with the accurate movement of the belt and result in consequent inaccurate feeding of the document. Lines printed on the document can therefore be irregularly spaced.

Various means have been suggested for retaining belts in tractors. U.S. Pat. No. 4,421,261 issued Dec. 20, 1983 to L. J. Hubbard describes a tractor with a frame member extending along a reach of the belt for guiding the belt and maintaining it along a convexly curved path. This patent refers to other patents wherein various forms of belt drives and retainment have been suggested. Among these patents is U.S. Pat. No. 4,194,660 issued Mar. 25, 1980, wherein wall surfaces extend closely adjacent to the belt on opposite sides of the pins to prevent disengagement of the belt from the sprocket. The mode of retainment described in the U.S. Pat. No. 4,194,660 is disadvantageous in that a large area of the retaining surface can contact the belt, and even the sides of the pins, and impose a drag on the belt which unduly loads the drive motor of the tractor. Moreover, this load may be intermittent and can prevent the drive motor from uniformly accelerating and accurately driving the sprocket and the belt. The problems of accurate feeding of the document and uniform line spacing are therefore not completely solved by the scheme used in the U.S. Pat. No. 4,194,660 for retaining the belt on the sprocket.

The object of the present invention is to provide an improved mechanism for use in a tractor which feeds perforated webs and which retains the belt on the sprocket as the belt rotates with the sprocket, while accurately guiding the belt with minimal additional friction which can load the drive motor for the tractor.

It is a further object of the present invention to provide an improved document feeding tractor in which the registration of the belt and the sprocket is retained by presenting a circumferential retainer spaced outwardly from the sprocket a distance slightly greater than the altitude of the pins, and wherein only the tips of the pins can contact the wall, so that the belt is retained with its lugs in circumferential registration with the receptacles of the sprocket.

Briefly described, the invention is adapted for use in a tractor for feeding perforated webs (also referred to herein as documents) having an endless belt with pins projecting outwardly and lugs projecting inwardly from the belt. The tractor has a sprocket journaled in a frame. The sprocket has receptacles for the lugs on the belt. The frame defines a path of travel for the belt along opposite sides of the tractor. The pins are presented for engagement with the perforations in the webs along at least one of these opposite sides. The path of travel of the belt extends around the sprocket. The invention provides an improved mechanism for retaining the belt with the lugs in engagement with the sprocket as the belt rotates with the sprocket. The mechanism utilizes a member presenting circumferential retainer spaced outward from the sprocket a distance slightly greater than the altitude of the pins. The member is disposed between extensions of the ends of the frame of the tractor. The circumferential retainer therefore, presents a guide surface, preferably in the form of a circumference with slight clearance for the tips of the pins. The belt is, therefore, retained in circumferential registration with the sprocket, and with the lugs on the belt in circumferential synchronism, with the receptacles of the sprocket. Since only the tips of the pins can engage the retainer, the drag on the belt, and the load on the motor which drives the sprocket, is minimized.

The foregoing and other objects, features and advantages of the invention, as well as a presently preferred embodiment thereof, will become more apparent from a reading of the following description in connection with the accompanying drawings in which.

Figure 1:
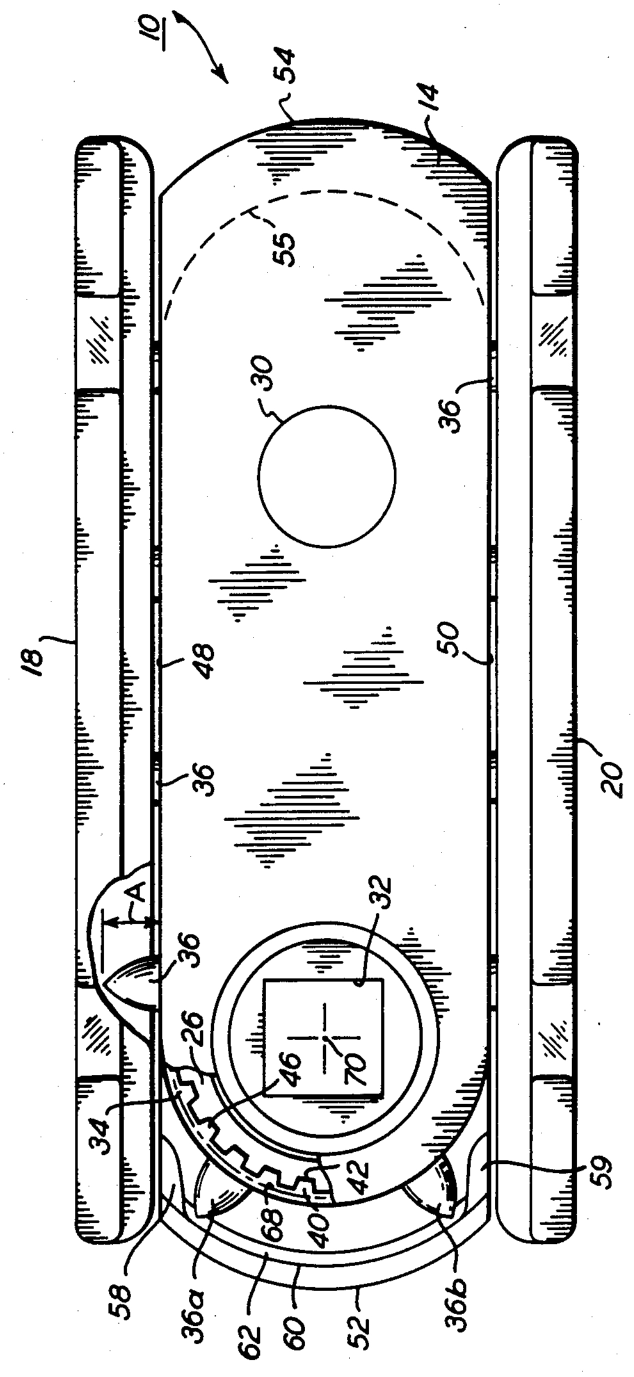
FIG. 1 is a view in elevation and partly broken away of a document feed tractor embodying the invention.

Referring to the drawings, there is shown a tractor having a frame 10 formed by side plates 12 and 14, which are joined along a parting surface 16. The side plates 12 and 14 may be held together by suitable fastening devices, such as bolts (not shown). Lids 18 and 20 are pivotally mounted on the side plate 12 and may be journaled in brackets 22 and 24. A sprocket 26 is journaled in the frame 10, as in holes 28 extending through the side plates. Another hole 30 is provided, which schematically illustrates the location of the support rod for the tractor. A clamping mechanism (not shown) of the type described in U.S. Pat. No. 4,129,239 issued to L. J. Hubbard may be provided for clamping the tractor to the support rod. A square drive shaft extends through the square hole 32 in the sprocket 26. This drive shaft is connected, using suitable gearing, if necessary, to a stepper motor (not shown) which drives the sprocket 26 and the belt 34. The belt has pins 36 spaced from each other at a pitch equal to the pitch of the perforations in the document. The belt also has lugs 40 which are received in receptacles 42 on the surface of the sprocket 26. The pins have an altitude indicated at "A" in FIG. 1.

Figure 2:
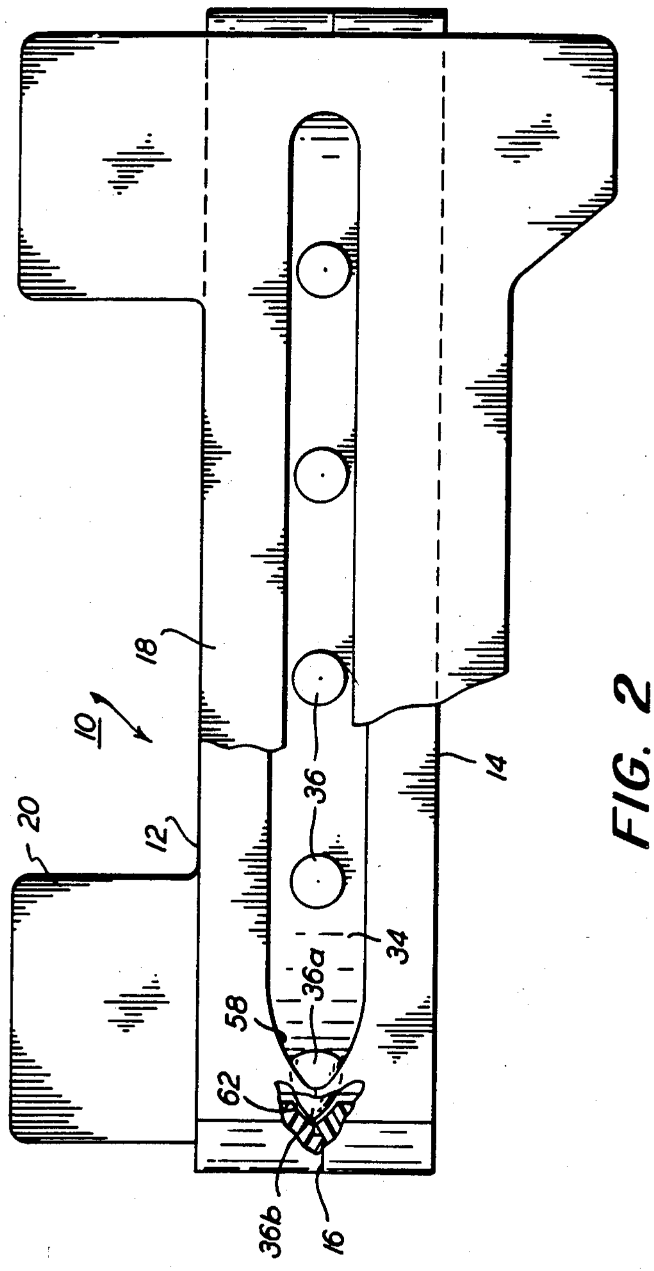
FIG. 2 is a plan view of the tractor shown in FIG. 1, also partly broken away.
Figure 3:
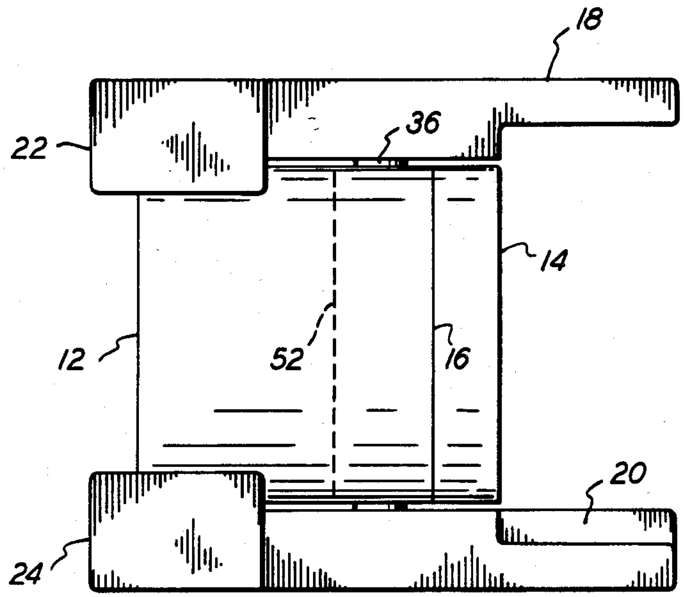
FIG. 3 is an end view of the tractor shown in FIG. 1.

FIG. 2 is broken away so as to show the pin **36*b*, which is the upper most of the pins 36*a* and 36*b* as shown in FIG. 1. The frame guides the belt along top and bottom sides 48 and 50 of its path of travel between the upper lid 18 and the frame 10 and between the lower lid 20 and the frame 10. The endless belt 34 extends around the sprocket 26 approximately 180 degrees as the belt 34 travels around the sprocket. The documents or webs are stripped by top and lower surfaces 58 and 59 which are part of the member 52. Members 52 and 54 are integral with the side plates 12 and 14 of the frame 10. These members are disposed between extensions of the sides 48 and 50 of the path of the belt 34. The stripper surfaces 58 and 59 project laterally under the paper path. It may be noted that the side plates of the frame which form the member 52 define a surface 60** which is concave and circumferential and approximately 180 degrees in arc for guiding the pins 36 if the lugs try to leave the sprocket between the sides 48 and 50. The side plates 12 and 14 define a convex circumferential surface 55 at the end of the path opposite from the sprocket 26. The belt is guided by this surface 55 around the opposite end of the path.

At least the member 52, which is at the end of the frame where the sprocket 26 is journaled, has a notch 62 therein. The notch is formed by indentations in the parting surface 16. This retaining surface 60 with the notch 62 presents a circumferential registration pin retainer. The retaining surface 60 is spaced circumferentially outward from the sprocket a distance slightly exceeding the altitude "A" of the pins 36. The tips of the pins are received in slightly clear of the notch 62. The clearance may be a few thousandth of an inch.

The arc of the circumferential registration retaining surface 60 is sufficiently long (at least the pitch of the pins along the pitch line 68 of the belt, plus the additional distance due to the clearance and the altitude A which separates the surface 60 from the pitch line 68). This line, which is the pitch diameter at the sprocket 26, is indicated by the long and short dashes. It will be observed that the tips of the pins 36 slightly clear the circumferential surface 60 and are the only parts of the belt 34 that can make contact with the surface 60, thereby minimizing the drag on the belt and the load on the motor which drives the sprocket. The distance between the surface and the pins is slightly greater than the Altitude A so that the registration of the lugs 40 and the receptacles 42 is retained.

It will be noted that the center of the arc defined by the surface 60 is the same center as the axis of rotation 70 of the sprocket. It is therefore easy to maintain accurate spacing in the design of the parts and thereby provide uniform, non-intermittent contact between the pins 36 and the circumferential registration retaining surface 60. The slight, additional load provided by the surface 60 due to the contact with the pins is therefore uniform and only when needed to keep circumferential registration.

From the foregoing description, it will be apparent that there has been provided an improved document feed tractor with improved means for retaining and maintaining the registration of the belt on the sprocket of the tractor. The invention is especially suitable for use with tractors having belts made of elastomeric/plastic materials. However, other applications and various other modifications of the herein described tractor, within the scope of the invention will undoubtedly suggest themselves to those skilled in the art. Accordingly, the foregoing description should be taken as illustrative and not in a limiting sense.

I claim:

1. In a tractor for feeding perforated webs having an endless belt with pins projecting outwardly and lugs projecting inwardly therefrom, a sprocket having receptacles for said lugs, a frame in which said sprocket is journaled and which defines a path of travel for said belt extending along opposite side along opposite sides of the frame, from at least one of which sides said pins are presented for engagement with the perforations in the web, and around said sprocket, an improved mechanism for retaining said belt with said lugs in engagement with said sprocket as said belt rotates with said sprocket between said sides of said belt, said mechanism comprising a member adjacent said sprocket presenting a retaining surface spaced outward from said pins a distance slightly greater than the altitude of said pins to provide a clearance of about a few thousandths of an inch to keep the lugs in engagement with the sprocket, and said member being disposed between extensions of said sides of said path.

2. The invention as set forth in claim 1 wherein said surface is partially circumferential.

3. The invention as set forth in claim 2 wherein said circumferential surface is along an arc having a center, and said sprocket has an axis of rotation common with said center.

4. The invention as set forth in claim 3 wherein said arc is longer than the pitch of said pins on said belt.

5. The invention as set forth in claim 1 wherein said member has a notch in which the tips of said pins are received and slightly clear.

6. The invention as set forth in claim 5 wherein said member is integral with said frame.

7. The invention as set forth in claim 6 wherein said frame has two parts which are assembled along a parting surface and said notch is provided by indentions in said wall which meet at said parting surface.

8. The invention as set forth in claim 5 wherein the cross section of said notch has a shape complimentary to the shape of the tips of said pins.

* * * * *